(12) United States Patent
Goh et al.

(10) Patent No.: US 12,111,799 B2
(45) Date of Patent: Oct. 8, 2024

(54) AUTOMATICALLY PROVISIONING DATABASES IN A METAVERSE

(71) Applicant: Dell Products L.P., Round Rock, TX (US)

(72) Inventors: Wai Teck Goh, Klang (MY); Say Heian Lee, Cyberjaya (MY); Tivagar Polanippan, Puchong (MY); Kah Wai Kor, Petaling Jaya (MY); Karman Yap, Cheras (MY)

(73) Assignee: Dell Products L.P., Round Rock, TX (US)

( * ) Notice: Subject to any disclaimer, the term of this patent is extended or adjusted under 35 U.S.C. 154(b) by 200 days.

(21) Appl. No.: 17/970,195

(22) Filed: Oct. 20, 2022

(65) Prior Publication Data

US 2024/0134831 A1   Apr. 25, 2024
US 2024/0232145 A9   Jul. 11, 2024

(51) Int. Cl.
*G06F 16/21* (2019.01)
*G06F 16/25* (2019.01)
*G06T 13/40* (2011.01)

(52) U.S. Cl.
CPC .......... *G06F 16/212* (2019.01); *G06F 16/256* (2019.01); *G06T 13/40* (2013.01)

(58) Field of Classification Search
CPC ...... G06F 16/212; G06F 16/256; G06T 13/40
See application file for complete search history.

(56) References Cited

U.S. PATENT DOCUMENTS

| 9,235,319 B2 | 1/2016 | Finn et al. |
| 2015/0379046 A1 | 12/2015 | Sundaresan et al. |
| 2017/0371876 A1* | 12/2017 | Bailey ..................... G06T 15/00 |
| 2018/0104595 A1* | 4/2018 | Kawachiya ............. A63F 13/79 |

* cited by examiner

*Primary Examiner* — Cam Y T Truong
(74) *Attorney, Agent, or Firm* — Ryan, Mason & Lewis, LLP

(57) ABSTRACT

Methods, apparatus, and processor-readable storage media for automatically provisioning databases in a metaverse are provided herein. An example computer-implemented method includes processing data, input associated with at least one avatar in at least one metaverse, pertaining to provisioning one or more databases in connection with the at least one metaverse; provisioning at least one of the one or more databases based at least in part on the processing of the data pertaining to provisioning one or more databases in connection with the at least one metaverse; rendering a three-dimensional model representation of the at least one provisioned database in the at least one metaverse; and performing one or more automated actions based at least in part on one or more avatar actions carried out in connection with the rendered three-dimensional model representation of the at least one provisioned database in the at least one metaverse.

20 Claims, 12 Drawing Sheets

```
POST
    http ://{HOSTNAME} : 8080/service/notification/subscribe/event_id

{
    "database_name" : "abcde_19c.prd.amer.CompanyX.com",
    "database_status" : "Provision Completed",
    "database_env" : "Production",
    "database_type" : "Oracle",
    "database_version" : "19.1.2.3.4",
    "database_instance" : 2,
    "database_space" : 50GB,
    "active" : true,
    "id" : 1000
}

POST
    http: //{HOSTNAME} : 8080/service/provision/service_id

{
    "ResourceType": "Event",
    "Condition" : "Event Type EQUALS \ "provision complete\" ",
    "source" : "database provisioning and management system",
    "database_name" : "abcde_19c.prd.amer.CompanyX.com",
    "database_type" : "Oracle",
    "database_version" : "19.1.2.3.4",
    "database_instance" : 2,
    "database_space" : 50GB,
    "active" : true,
    "database_status" : "Provision Completed",
    "description" : "The Database is ready to use",
    "id" : 1001
}
```

```
public void backup (){
    userId = get current logon user ID
    userCredential = get current logon credential
    dbName = get database name of 3D database object
    serverName = get server name of 3D database object
    backupLocation = get value from backup location input if (backupLocation == null){
        return notification "Please enter database backup location";
    }
    else{
        var backupInfo= {
            dbInfo.user_id=userId;
            dbInfo.credential= userCredential;
            dbInfo.database_name = dbName;
            dbInfo.server_name = serverName;
            dbInfo.backup_location = backupLocation;
        }
        backupDb(dbInfo);
    }

} public void backupDb (backupInfo){
    var apiResponse = send API call along with backupInfo to DPMS to backup the database
    if (apiResponse == true) {
        return notification "Database backup successful"
    }
    else {
        return notification "Failed to backup database, please try again"
    }
}
```

FIG. 10

```
Const API_KEY = "Service_id";
function init () {
  document.querySelector("#layout-Name").addEventListener("layout",name)
  document.querySelector("#layout-Type").addEventListener("layout",type)
  document.querySelector("#layout-Version").addEventListener("layout",version)
  document.querySelector("#layout-Space").addEventListener("layout",space)
}
  fetch('https://poly.CompanyZapis.com/v1/assets?keywords=${keywords}&format=OBJ&key=${API_KEY}',
  {header: {'Access-Control-Allow-Origin':'*',}})
    .then(event => event.json())
    .then(saveObjResourcesLocally)

function renderCurrentObj(objArr) {
    scale = 1;
    let displayItem = objArr[objInt]
    let objItem = document.createElement("a-asset-item");

objItem.id = "current-obj";
    objItem.setAttribute('src','${displayItem.rootUrl}');
    let objMat = document.createElement("a-asset-item");
    objMat.id = "current-mtl";
    objMat.setAttribute('src','${displayItem.mtl}');
    let objEntity = document.createElement("a-entity");
    objEntity.id = "current-entity"
    objEntity.setAttribute('obj-model',"obj: #current-obj; mtl: #current-mtl");
    document.getElementById("model-Name").innerText = ' ${displayItem.displayName} '
    document.getElementById("model-Type").innerText = ' ${displayItem.displayCPU} '
    document.getElementById("model-Version").innerText = ' ${displayItem.displayRAM} '
    document.getElementById("model-Space").innerText = ' ${displayItem.displaySwap} '
  }
```

FIG. 11

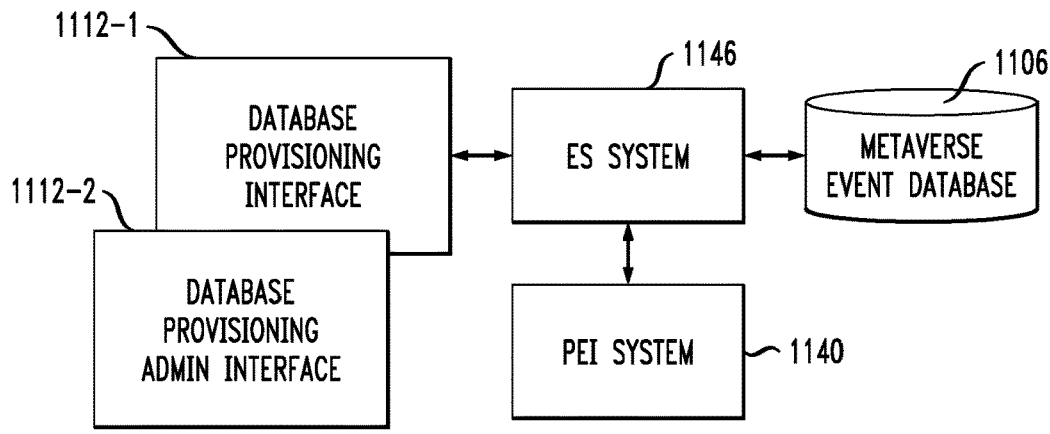

FIG. 12

```
{
  "Event Name": "Production Provision Events",
  "filter criteria": [
    {
      "ResourceType": "Event",
      "Condition": "Event Type EQUALS \"provision complete\"",
      "criteria": [
        {
          "ResourceType": "Database",
          "condition": "Type EQUALS \"Mongo\""
        },
        {
          "ResourceType": "Data Center",
          "condition": "Location EQUALS \"Prod_LocationX\""
        },
        {
          "ResourceType": "Group",
          "condition": "Name EQUALS \"Operation\""
        }
      ]
    }
  ],
}
```

AUTOMATICALLY PROVISIONING DATABASES IN A METAVERSE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to storage in such systems.

BACKGROUND

In conventional data systems, an interface can be used to facilitate user interaction with an existing database. However, conventional data systems do not allow users to create databases or manage databases in a metaverse, which can limit and/or reduce user productivity, user efficiency, and user experience.

SUMMARY

Illustrative embodiments of the disclosure provide techniques for automatically provisioning databases in a metaverse. An exemplary computer-implemented method includes processing data, input associated with at least one avatar in at least one metaverse, pertaining to provisioning one or more databases in connection with the at least one metaverse, and provisioning at least one of the one or more databases based at least in part on the processing of the data pertaining to provisioning one or more databases in connection with the at least one metaverse. The method additionally includes rendering a three-dimensional model representation of the at least one provisioned database in the at least one metaverse, and performing one or more automated actions based at least in part on one or more avatar actions carried out in connection with the rendered three-dimensional model representation of the at least one provisioned database in the at least one metaverse.

Illustrative embodiments can provide significant advantages relative to conventional data systems. For example, problems associated with limitations related to user productivity, user efficiency, and user experience are overcome in one or more embodiments through automatically provisioning and management databases in a metaverse in connection with avatar actions.

These and other illustrative embodiments described herein include, without limitation, methods, apparatus, systems, and computer program products comprising processor-readable storage media.

BRIEF DESCRIPTION OF THE DRAWINGS

FIG. 6 shows example pseudocode for implementing at least a portion of a PEI system in an illustrative embodiment.

FIG. 8 shows example pseudocode for a database backup request in an illustrative embodiment.

FIG. 10 shows example pseudocode for rendering a 3D database model representation in a metaverse in an illustrative embodiment.

FIG. 11 shows an example workflow involving a database provisioning interface and an event subscription (ES) system in an illustrative embodiment.

FIG. 12 shows example pseudocode for implementing JavaScript object notation (JSON) parameters in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
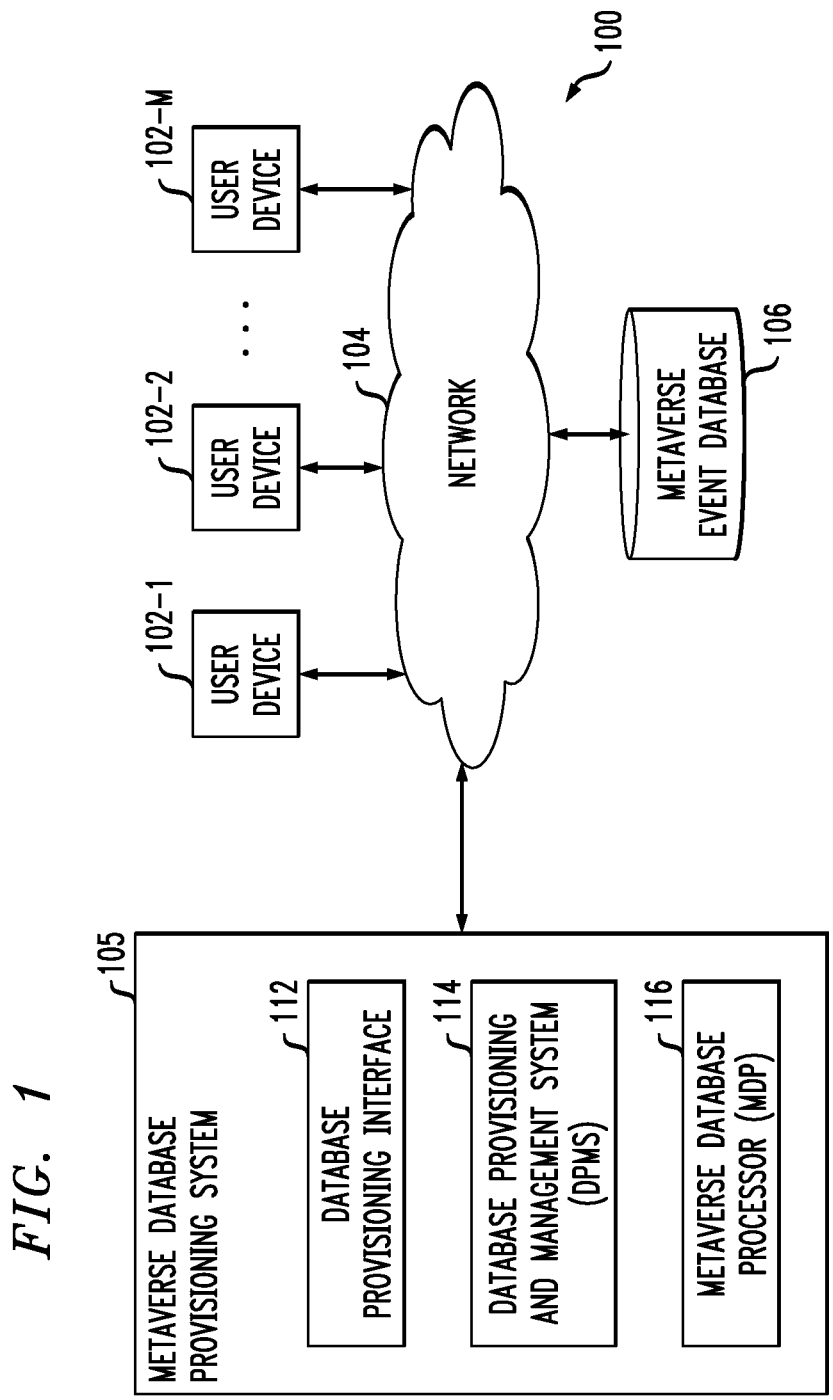
FIG. 1 shows an information processing system configured for automatically provisioning databases in a metaverse in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is metaverse database provisioning system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, metaverse database provisioning system 105 can have an associated metaverse event database 106 configured to store data pertaining to provisioning databases in one or more metaverses, which comprise, for example, database-related rules, database-related feature information, provisioning-related information, etc.

The metaverse event database 106 in the present embodiment is implemented using one or more storage systems associated with metaverse database provisioning system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with metaverse database provisioning system 105 are one or more input-output devices, which illustratively comprise keyboards, displays or other types of input-output devices in any combination. Such input-output devices can be used, for example, to support one or more user interfaces to metaverse database provisioning system 105, as well as to support communication between metaverse database provisioning system 105 and other related systems and devices not explicitly shown.

Additionally, metaverse database provisioning system 105 in the FIG. 1 embodiment is assumed to be implemented using at least one processing device. Each such processing device generally comprises at least one processor and an associated memory, and implements one or more functional modules for controlling certain features of metaverse database provisioning system 105.

More particularly, metaverse database provisioning system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows metaverse database provisioning system 105 to communicate over the network 104 with the user devices 102, and illustratively comprises one or more conventional transceivers.

The metaverse database provisioning system 105 further comprises database provisioning interface 112, database provisioning and management system (DPMS) 114, and metaverse database processor (MDP) 116.

It is to be appreciated that this particular arrangement of elements 112, 114 and 116 illustrated in the metaverse database provisioning system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for metaverse database provisioning involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, metaverse database provisioning system 105 and metaverse event database 106 can be on and/or part of the same processing platform.

An exemplary process utilizing elements 112, 114 and 116 of an example metaverse database provisioning system 105 in computer network 100 will be described in more detail with reference to the flow diagram of FIG. 13.

Accordingly, at least one embodiment includes generating and/or implementing a metaverse database provisioning system. When an avatar is used to login to a metaverse, a database provisioning interface can appear to allow the avatar to enter provisioning data related to database metadata. Once completed, the interface sends at least a portion of the provisioning data to a DPMS to create a corresponding database. When the database provisioning is completed, an MDP is used on the metaverse to project a 3D database model that allows the avatar to interact with one or more database features.

As used herein, a metaverse refers to a network of one or more 3D virtual ecosystems (e.g., ecosystems focused on social connection). Additionally, a DPMS refers to a software component to provision and manage at least one database, wherein such a component includes a set of one or more application programming interfaces (APIs) that allow and/or enable interaction with one or more other software components.

As also used herein, an MDP refers to a software component that provides event-related services, broker-related services, rendering-related services, and/or rule repository-related services for one or more graphical user interfaces (GUIs). As used herein, a 3D database model refers to a projected 3D visual representation of a database in a metaverse using at least one rendering engine. Additionally, as used herein, an avatar refers to a 3D visual representation of a real world user in a metaverse.

As further detailed herein, one or more embodiments include enabling a user, via a corresponding avatar, to login to a metaverse and/or be active in a metaverse, and to interact with at least one database provisioning system interface. Such an embodiment includes facilitating the capturing of database provisioning metadata being used by a DPMS to carry out the actual database provisioning. When a given database is being provisioned, the avatar can monitor and/or manage the appearance of the 3D database representation shown on the metaverse, in conjunction with an MDP. Also, in such an embodiment, the avatar is able to interact with the provisioned database to perform one or more database functionalities. For example, the avatar can start the database and/or grab at least one table using a command interface presented in connection with the 3D database model via the MDP in the background.

Figure 2:
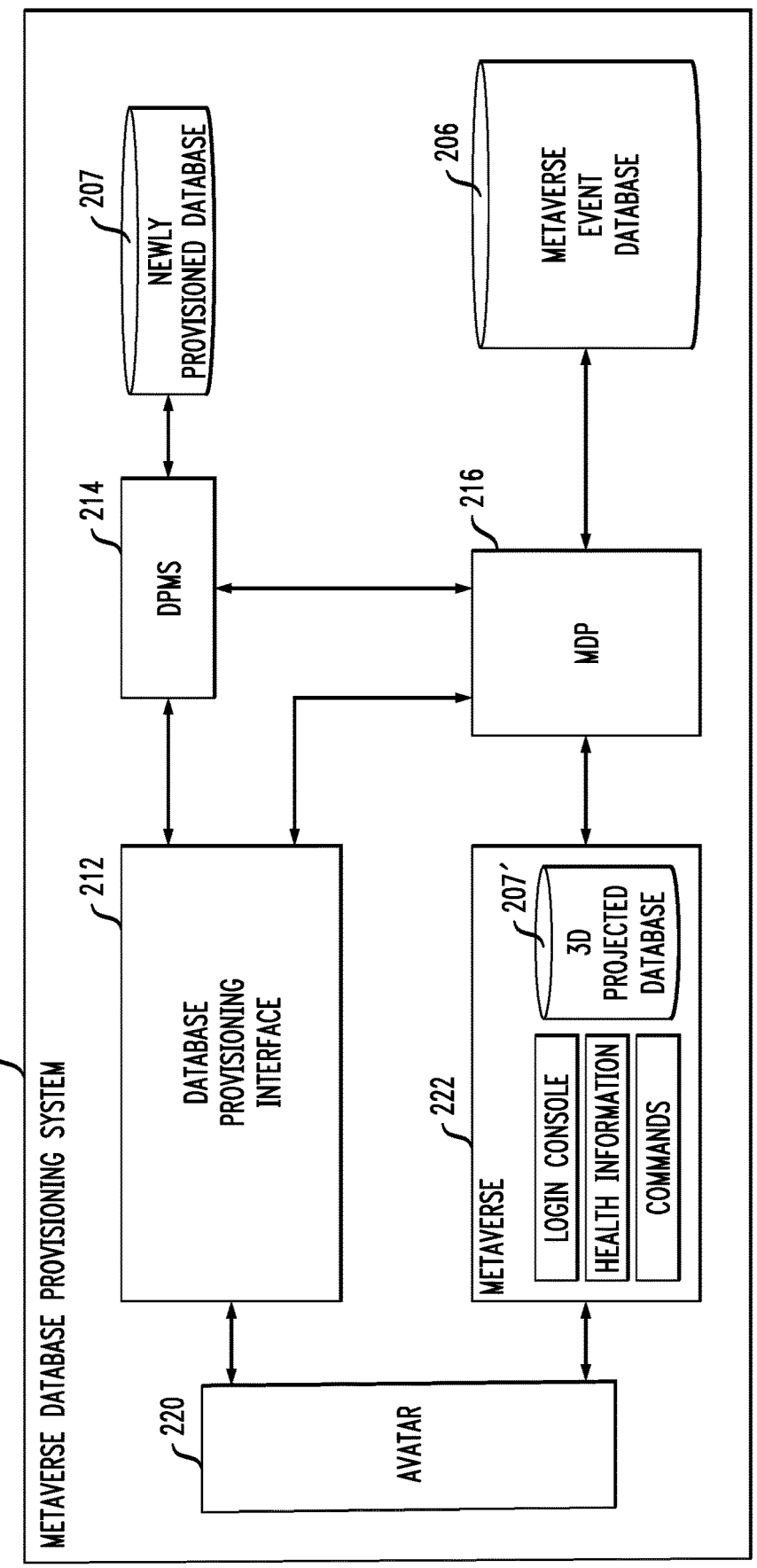
FIG. 2 shows example architecture of an metaverse database provisioning system in an illustrative embodiment.

FIG. 2 shows example architecture of an metaverse database provisioning system in an illustrative embodiment. By way of illustration, FIG. 2 depicts metaverse database provisioning system 205, which can be implemented, as detailed herein, for database provisioning in a metaverse 222. In at least one embodiment, database provisioning interface (e.g., a GUI) is used to obtain (e.g., from DPMS 214) database metadata required to allow avatar 220 to input the provisioning data into the DPMS 214 via database provisioning interface 212. As depicted in FIG. 2, the provisioning data is sent to DPMS 214 to create a newly provisioned database 207 (e.g., including creating a virtual machine in connection with database 207 and having a given operating system installed in the virtual machine).

When the database 207 is being created, the database 207 has no knowledge of how to present itself in the metaverse 222. Accordingly, MDP 216 is utilized to obtain and/or process at least a portion of the database metadata (e.g., after the database provisioning is successful, MDP 216 is notified by DPMS 214 about the database provisioning and where the notification includes metadata of the provisioned database) and render the metadata on the metaverse 222 to allow avatar 220 to be able to use one or more database features in the metaverse 222. The MDP 216 also acts as a communication layer to facilitate communication between one or more components (e.g., login console, health information component, commands, etc.) of metaverse 222 and DPMS 214. In other words, MDP 216 can serve as a binding communication layer between at least one virtual world and the real world.

When avatar 220 interacts with a 3D database projection 207' (also referred to herein as a 3D model representation) of database 207 in metaverse 222, avatar 220 can, for example, use the login console and/or START/STOP commands to grab a table stored within database 207 and display health information about the database 207. By way of illustration, when avatar 220 issues a START command, for example, by pressing down a button on the 3D database projection 207' in metaverse 222, data pertaining to that event is sent back to the MDP 216 for processing by receiving the event data and modifying at least a portion of the event data to at least one API call the DPMS 214. When the START event is completed in database 207, the DPMS 214 sends back a notification event that is captured by MDP 216, which displays the result of the event on the 3D database projection 207' in metaverse 222.

Additionally, in connection with one or more embodiments such as depicted in FIG. 2, events subscription rules and event data can be stored on metaverse event database 206 for subsequent use and/or processing.

Figure 3:
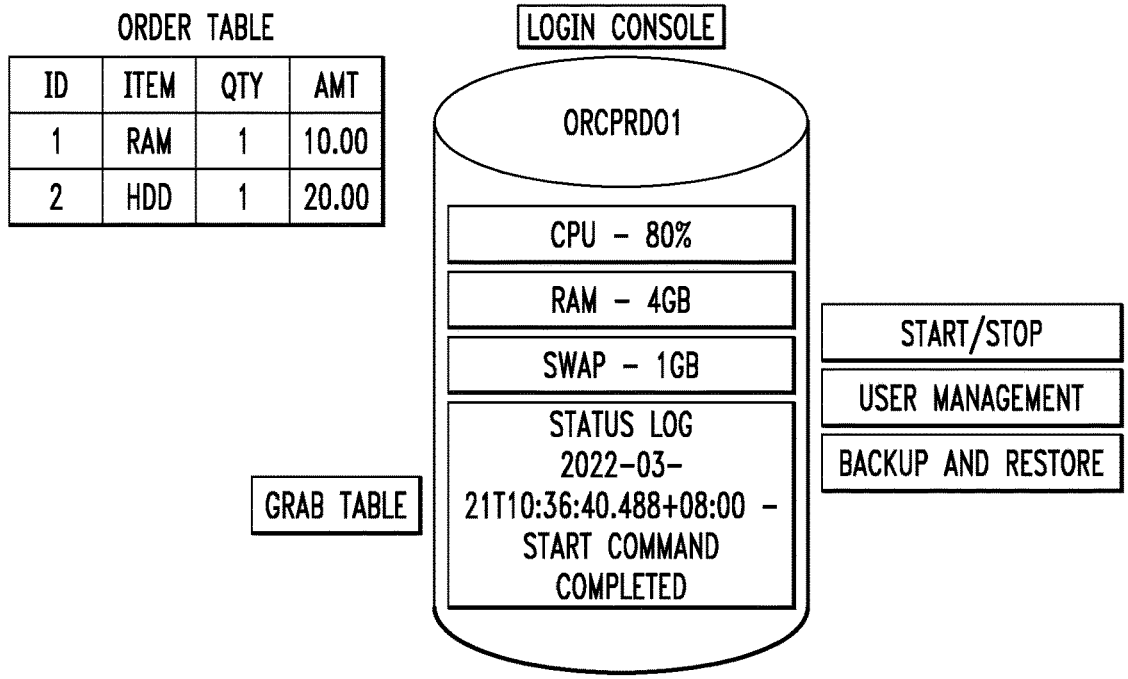
FIG. 3 shows an example three-dimensional (3D) model representation of a database in metaverse in an illustrative embodiment.

FIG. 3 shows an example 3D model representation of a database in metaverse in an illustrative embodiment. By way of illustration, FIG. 3 depicts 3D model representation 307' of a database in a metaverse, wherein the 3D model representation 307' includes a login console. START/STOP commands, a "Grab Table" functionality, an order table, a user management feature, a backup and restore feature, and health monitoring data being displayed (e.g., via an interface implemented in connection with the 3D model representation 307').

By way merely of example, 3D model representation 307' serves as a database model that is projected on a metaverse when the provisioning of a new database (e.g., database 207 in FIG. 2) is complete. Such a 3D model representation 307' not only enhances the user experience to manage the newly provisioned database, but 3D model representation 307' can also facilitate and/or enable opportunities and/or features in connection with database management in the metaverse. For example, as depicted in FIG. 3, an avatar now implements a feature referred to herein as a "Grab Table" functionality, which enables the avatar to grab any table in the database (e.g., by pressing a 'Grab Table' button and select any table(s) that exist in the database). The avatar then can view the corresponding table data in the metaverse.

On the 3D model representation 307', the avatar can view health and monitoring data of the database host. For example, the host operating system-level data (e.g., CPU, RAM, SWAP, etc.) can be displayed on at least one interface of the 3D model representation 307', and if one or more of the metrics are experiencing values that exceed one or more thresholds, for example, the MDP can be notified and, e.g., change the color of the metric in the 3D model representation 307' to reflect the actual state of the metric(s). Such monitoring data can be obtained through DPMS.

Additionally, in one or more embodiments, 3D model representation 307' can also include a status log on events and actions being performed on the database itself, and the avatar can obtain information as to whether a given event of action fails or succeeds via the status log. In connection with the console login, the 3D model representation 307' can use at least one terminal service that is connected directly to the provisioned database to perform the service and maintenance of the database.

Figure 4:
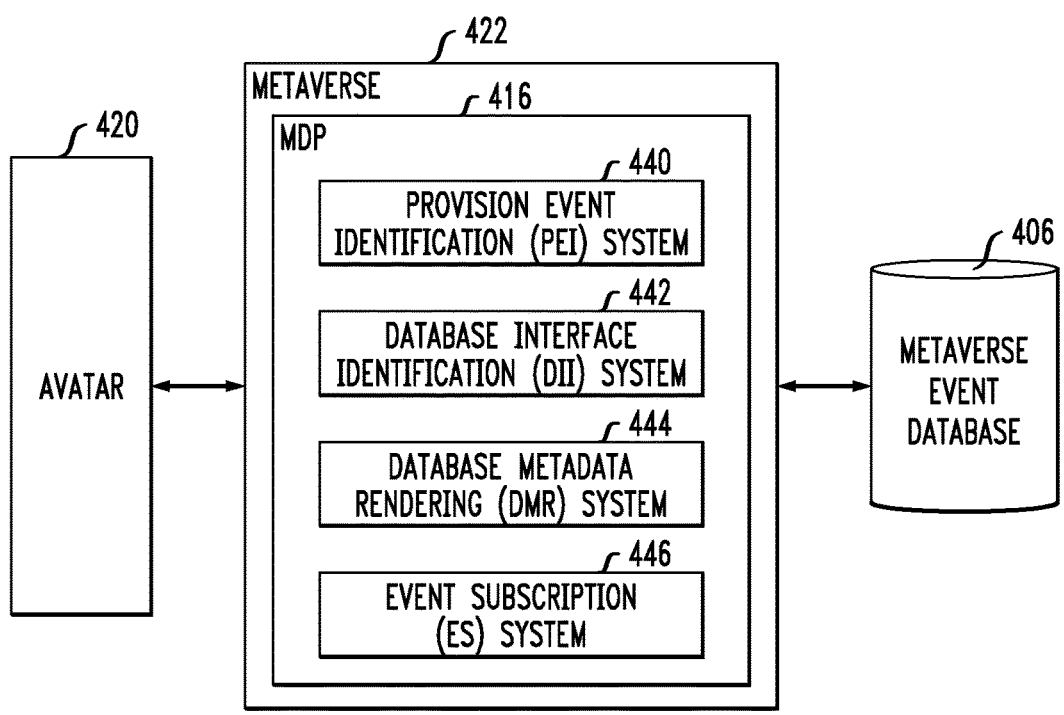
FIG. 4 shows an example metaverse database processor (MDP) in an illustrative embodiment.

FIG. 4 shows an example MDP in an illustrative embodiment. By way of illustration, MDP 416 includes provision event identification (PEI) system 440, which subscribes to provision events in DPMS and allows ES system 446 to define events to subscribe and listen to. For instance, a database provisioning completion event is an event that PEI system 440 listens to and/or for. As also depicted in FIG. 4, MDP 416 includes database interface identification (DII)

system 442, which handles actions on at least one database model representation interface. For example, when avatar 420 selects the START command, the DII system 442 captures the command selection and sends a corresponding API call to the database host via DPMS.

Further, MDP 416 includes database metadata rendering (DMR) system 444, which can receive, for example, a database provisioning completion event notification, interpret a corresponding metadata capture and call the core rendering engine of the metaverse 422 to render the 3D model of the provisioned database. Also, as depicted in FIG. 4, event subscription (ES) system 446 allows avatar 420 to define event subscription rules based at least in part on user needs. For example, ES system 446 can subscribe to different type of events, types of data center, avatar profiles, etc. As also illustrated in FIG. 4, metaverse event database 406 stores event type data to which avatar 420 can subscribe, and also serves as an event log repository.

In connection with FIG. 4 and one or more embodiments, as used herein, a PEI system 440 refers to a software component that provides event subscription services to DPMS and provides a callback holder for DPMS to provide notifications of any new events that occur. Accordingly, PEI system 440 can act as a proxy to allow other components in the MDP to subscribe to the events that exist in DPMS. Once the events are registered in DPMS, DPMS sends out the notification to PEI system 440 when the events occur in the DPMS. By way merely of illustration, example APIs expose by DPMS that can be used by MDP include the following:
/service/notification/subscribe/event id, to subscribe to a particular event on the DPMS;
/service/notification/unsubscribe/event id, to unsubscribe a particular event on DPMS;
/service/provision/service id/{parameters}, to provision a new database with metadata provided as parameters; and
/service/provision/service id/get, to get the particular database with metadata details.

Figure 5:
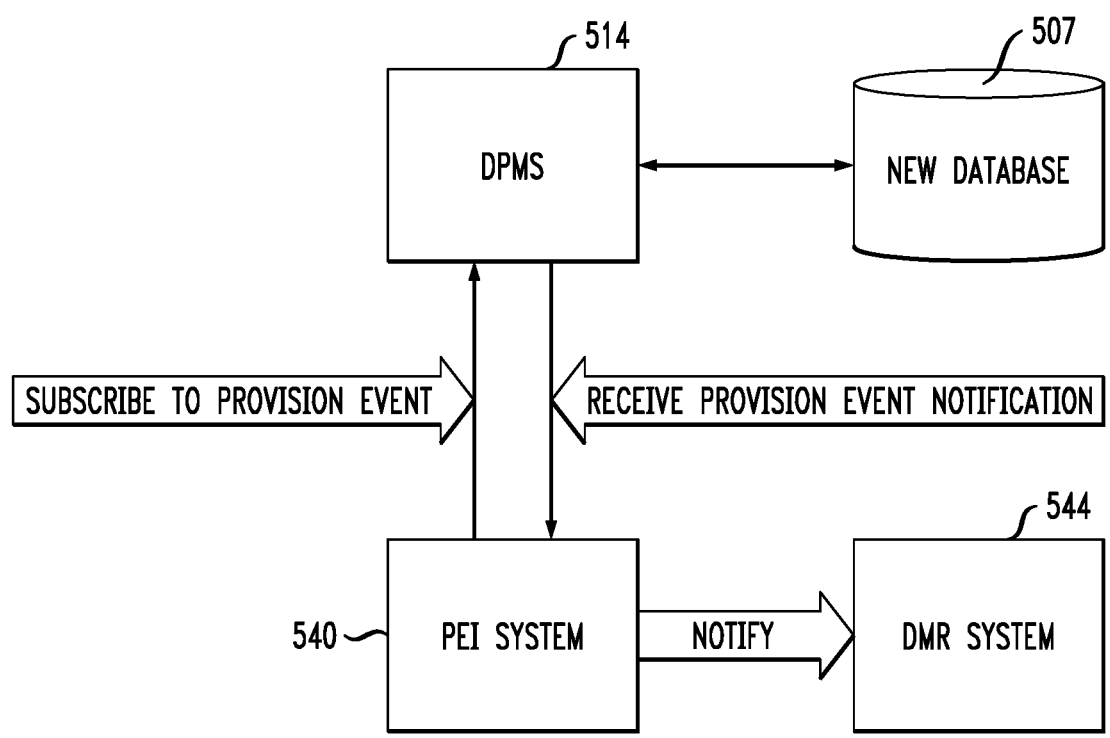
FIG. 5 shows an example provision event process flow between a provision event identification (PEI) system and a database provisioning and management system (DPMS) in an illustrative embodiment.

FIG. 5 shows an example provision event process flow between a PEI system and DMPS in an illustrative embodiment. By way of illustration, FIG. 5 depicts a process flow implemented when a new database 507 is successfully provisioned. In such a process flow, DPMS 514 triggers a callback to PEI system 540 via a hypertext transfer protocol (HTTP) API in the PEI system 540 to notify DMR system 544 that a new database 507 has been created and is ready for use. Accordingly, PEI system 540 receives a notification and calls the DMR system 544 to start rendering a 3D database model representation of the database 507 in the metaverse using corresponding database metadata.

In one or more embodiments, PEI system 540 acts as an interface between the MDP and DPMS 514 to facilitate the process on how provision events are triggered and communicated. Once PEI system 540 receives event data, PEI system 540 notifies DMR system 544 system and DMR system 544 begins rendering the corresponding 3D database model representation using data and/or metadata associated with the event.

FIG. 6 shows example pseudocode for implementing at least a portion of a PEI system in an illustrative embodiment. In this embodiment, example pseudocode 600 is executed by or under the control of at least one processing system and/or device. For example, the example pseudocode 600 may be viewed as comprising a portion of a software implementation of at least part of metaverse database provisioning system 105 of the FIG. 1 embodiment.

The example pseudocode 600 illustrates JSON data for two POST APIs that are used in connection with a PEI system. The first API call is to allow other software components in an MDP to subscribe to the events, and the second API call is to let other software components to call the PEI component to notify that the provisioning event is completed.

It is to be appreciated that this particular example pseudocode shows just one example implementation of a portion of a PEI system, and alternative implementations can be used in other embodiments.

Referring again to FIG. 4, and in connection with one or more embodiments, DTI system 442 includes a software component which handles input from 3D object model representations and acts as a communication handler among DPMS, DMR, and at least one 3D object model representations interface.

Figure 7:
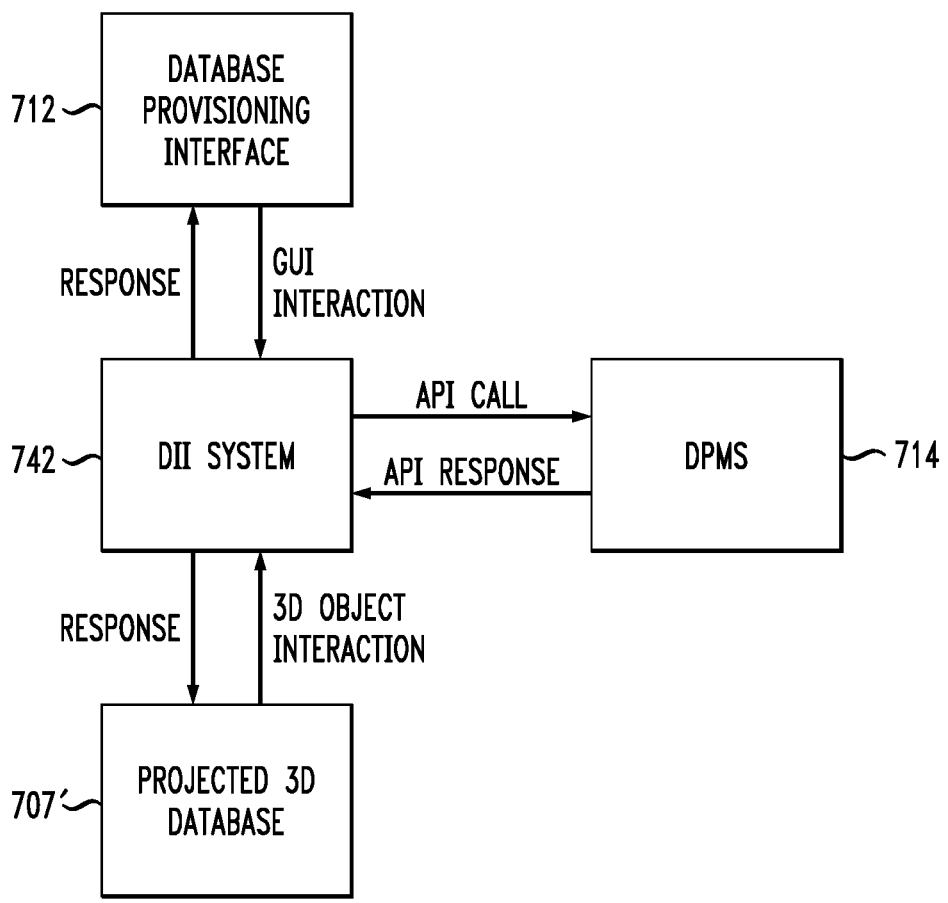
FIG. 7 shows an example process flow for responding to an interaction request in an illustrative embodiment.

FIG. 7 shows an example process flow for responding to an interaction request in an illustrative embodiment. By way of illustration, FIG. 7 depicts a process flow for implementing DTI system 742, a module which identifies the interaction request from an avatar in a metaverse and determines the subsequent step to process at least one output. An interaction request, as used in this context, can refer to an interaction between at least one avatar and at least one interactive object in a metaverse such as projected 3D database 707' (as referred to as 3D database model representation) and/or database provisioning interface 712 (e.g., a GUI) in the metaverse.

By way of example, in one or more embodiments, each GUI and 3D objects in a metaverse can be attached with a unique listener and a set of execution logic that is stored in DII system 742. When an avatar interacts with a GUI or a 3D object, DII system 742 identifies which interactive object was interacted with by the avatar through the object listener and executes the logic associated with the object. Such execution logic can include, for example, a set of requirements and instructions that explain how to process the interaction request from an avatar into a corresponding output. Execution logic, in such an embodiment, can include data requirement information, data source information, instructions for processing data, and instructions related to output(s) of the processing of the data.

With details from such execution logic, DII system 742 can determine what data is required and from where to extract such data. The data can, for example, be obtained from a GUI interface (e.g., database provisioning interface 712), a projected 3D object (e.g., projected 3D database model representation 707'), at least one external API, etc. After identifying the data source(s), DII system 742 validates at least a portion of the data based on the data requirements in the execution logic to ensure that all required data are available and in one or more correct formats. If there is any missing or invalid input data, DII system 742 will output a validation alert to request the valid data from user (e.g., the user corresponding to the given avatar). After all required data are obtained and validated, DII system 742 processes the data based at least in part on the instructions in the execution logic and passes the processed data to one or more specific destinations to produce one or more given outputs. As also depicted in FIG. 7, DPMS 714 provides metadata and database provisioning-related data for DII system 742 to process, such that, for example, database provisioning interface 712 and projected 3D database model representation 707' can display correct data and projection(s) to users.

FIG. 8 shows example pseudocode for a database backup request in an illustrative embodiment. In this embodiment, example pseudocode 800 is executed by or under the control of at least one processing system and/or device. For example, the example pseudocode 800 may be viewed as comprising a portion of a software implementation of at least part of metaverse database provisioning system 105 of the FIG. 1 embodiment.

The example pseudocode 800 illustrates pseudocode for a database backup request in a DII system. For example, when the avatar clicks on a "Backup" button (such as, for instance, depicted in FIG. 3), a corresponding DII system receives a notification from the button listener and executes the database backup logic associated with the button. According to the database backup logic, the DII system retrieves the required backup details and validates the data. Subsequently, the DII system makes an API call along with the backup details to DPMS to back up the particular database. Once the backup process is completed, DPMS will return the backup status to the DII system, and the DII system will notify the user (e.g., via a corresponding avatar) of the backup status.

It is to be appreciated that this particular example pseudocode shows just one example implementation of a database backup request, and alternative implementations can be used in other embodiments.

As noted herein (e.g., in FIG. 4), and in connection with one or more embodiments, a DMR system includes a software component which provides metaverse rendering services via one or more HTTP APIs. Once data (e.g., (database name, database type, version information, space information, etc.) are captured in at least one HTTP API call, the DMR system renders the 3D object model representation in the given metaverse. DMR system renders the 3D object by using at least one core rendering engine of a corresponding metaverse based at least in part on data received via one or more API calls. When the DMR system receives a database provisioning completion event, the DMR system interprets the metadata capture and calls the core rendering engine of the metaverse to render the 3D model of the database.

Subsequently, the DMR system uses data from a PEI event and starts calling the metaverse rendering engine (e.g., via one or more Poly APIs) to render the 3D object in the virtual reality scene based, for example, on A-frame. As used in connection with such an example embodiment, A-Frame is a hypertext markup language-based (HTML-based) framework which enables the capability to build web-based virtual reality scenes and environments. With both Poly APIs and A-frame in place, a 3D model representation of the given database can be rendered in a metaverse and called by the DMR system.

Figure 9:
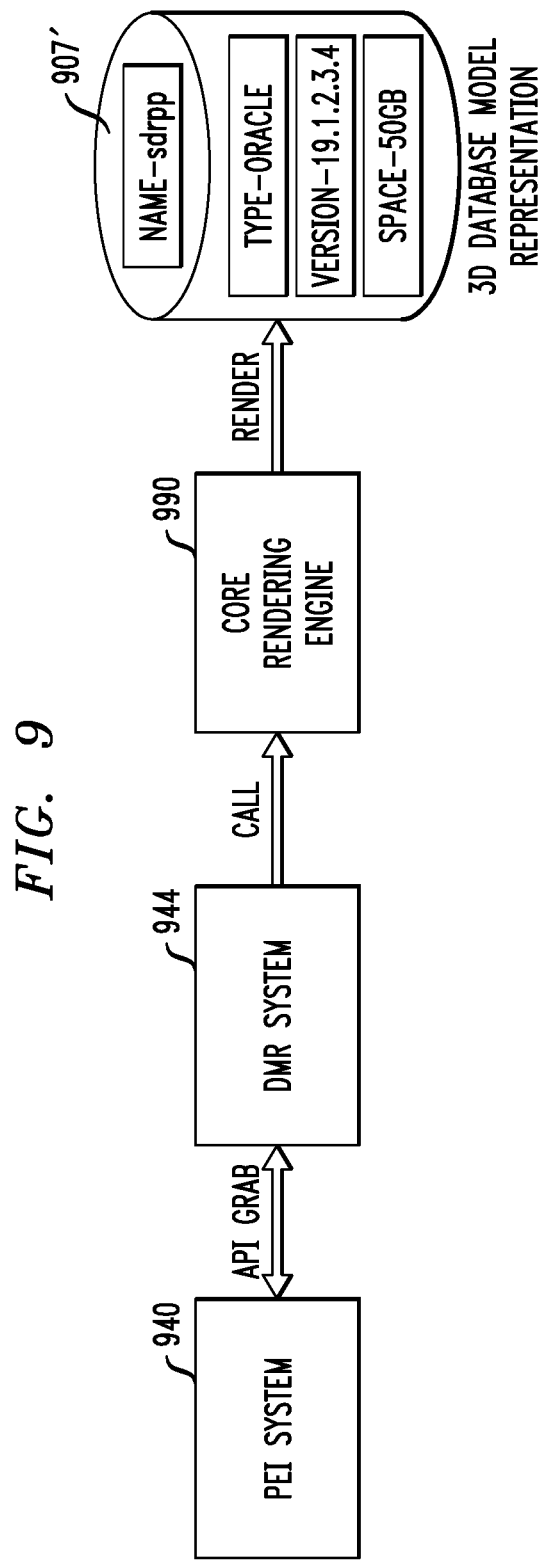
FIG. 9 shows an example workflow involving a core rendering engine in an illustrative embodiment.

FIG. 9 shows an example workflow involving a core rendering engine in an illustrative embodiment. By way of illustration, FIG. 9 depicts interactions between DMR system 944, core rendering engine 990, and PEI system 940 within a metaverse context. In one or more embodiments, core rendering engine 990 can include one or more Poly APIs having GLTFs (e.g., a file type used in connection with 3D models) which can work, for example, in connection with A-Frame. As depicted in FIG. 9, after DMR system 944 makes the call to core rendering engine 990, core rendering engine 990 grabs and/or obtains (via DMR system 944) what data are needed via an API in a JSON event from PEI system 940 and starts rendering the given database into a 3D database model representation 907' in the given metaverse.

FIG. 10 shows example pseudocode for rendering a 3D database model representation in a metaverse in an illustrative embodiment. In this embodiment, example pseudocode 1000 is executed by or under the control of at least one processing system and/or device. For example, the example pseudocode 1000 may be viewed as comprising a portion of a software implementation of at least part of metaverse database provisioning system 105 of the FIG. 1 embodiment.

The example pseudocode 1000 illustrates rendering a 3D database object by displaying the name, type, version, and space information related to a database. After making the call, at least a portion of such data will be obtained via an API and put into a JSON object. Additionally, a RenderCurrentObj function will update the object and display the name, type, version, and space information.

It is to be appreciated that this particular example pseudocode shows just one example implementation of rendering a 3D database model representation in a metaverse, and alternative implementations can be used in other embodiments.

As noted herein (e.g., in FIG. 4), and in connection with one or more embodiments, an ES system includes a module which accepts input from at least one avatar via at least one GUI to define event rules and filtering criteria.

FIG. 11 shows an example workflow involving a database provisioning interface, with admin capabilities, and an ES system in an illustrative embodiment. In one or more embodiments, ES system 1146 allows an admin avatar to define rules of events to subscribe via database provisioning admin interface 1112-2, wherein database provisioning admin interface 1112-2 exists on and/or in connection with database provisioning interface 1112-1 (e.g., a GUI). In such an embodiment, only an avatar with admin privileges can configure and define the event subscription rules to DPMS. The avatar can subscribe to the events that are of interest, and, by way merely of example, a drop-down list on the database provisioning admin interface 1112-2 for event subscriptions available can include event types such as provisioning, notification, error, status, etc., database types such as Oracle, Mongo, structured query language (SQL), Postgres, etc., data center location such as non-production, production, etc., and DBA groups such as operation, machine learning, non-SQL, etc.

Referring again to FIG. 11, ES system 1146 offers a set of HTTPS APIs for at least one internal component to consume. For each API call, ES system 1146 handles one or more internal job functions. For example, ES system 1146 calls PEI system 1140 to subscribe to the event. If the event registration is successful, ES system 1146 stores corresponding data in metaverse event database 1106. By way of illustration, an example of an event subscription HTTPS API call can include the following:
POST https//host:8080/EventService/subscribe/EventType?Type=Provision.

FIG. 12 shows example pseudocode for implementing JSON parameters in an illustrative embodiment. In this embodiment, example pseudocode 1200 is executed by or under the control of at least one processing system and/or device. For example, the example pseudocode 1200 may be viewed as comprising a portion of a software implementation of at least part of metaverse database provisioning system 105 of the FIG. 1 embodiment.

The example pseudocode 1200 illustrates an event listener that listens to and/or for a database provisioning complete event. The database type in the example pseudocode 1200 is MongoDB, the database location is a production data center, and the group name is an operation group.

It is to be appreciated that this particular example pseudocode shows just one example implementation of JSON parameters, and alternative implementations can be used in other embodiments.

It is to be appreciated that a "model," as used herein, refers to an electronic digitally stored set of executable instructions and data values, associated with one another, which are capable of receiving and responding to a programmatic or other digital call, invocation, and/or request for resolution based upon specified input values, to yield one or more output values that can serve as the basis of computer-implemented recommendations, output data displays, machine control, etc. Persons of skill in the field may find it convenient to express models using mathematical equations, but that form of expression does not confine the model(s) disclosed herein to abstract concepts; instead, each model herein has a practical application in a processing device in the form of stored executable instructions and data that implement the model using the processing device.

Figure 13:
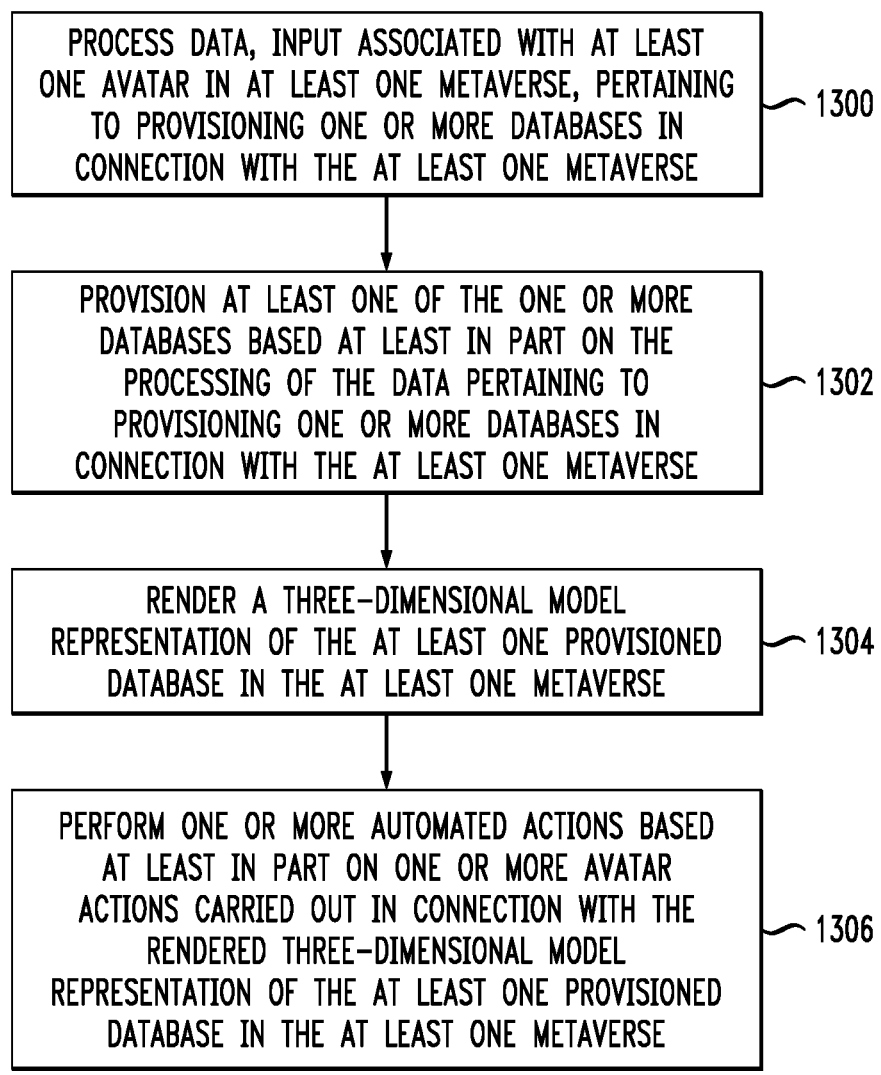
FIG. 13 is a flow diagram of a process for automatically provisioning one or more databases in a metaverse in an illustrative embodiment.

FIG. 13 is a flow diagram of a process for automatically provisioning one or more databases in a metaverse in an illustrative embodiment. It is to be understood that this particular process is only an example, and additional or alternative processes can be carried out in other embodiments.

In this embodiment, the process includes steps 1300 through 1306. These steps are assumed to be performed by metaverse database provisioning system 105 utilizing elements 112, 114 and 116.

Step 1300 includes processing data, input associated with at least one avatar in at least one metaverse, pertaining to provisioning one or more databases in connection with the at least one metaverse. In at least one embodiment, processing data pertaining to provisioning one or more databases in connection with the at least one metaverse includes implementing at least one graphical user interface in connection with the at least one metaverse.

Step 1302 includes provisioning at least one of the one or more databases based at least in part on the processing of the data pertaining to provisioning one or more databases in connection with the at least one metaverse. In one or more embodiments, provisioning at least one of the one or more databases includes initiating at least one application programming interface call to a database provisioning management system to request creation of at least one virtual machine. In such an embodiment, initiating at least one application programming interface call includes using one or more items of the data, pertaining to provisioning one or more databases in connection with the at least one metaverse, in the at least one application programming interface call as one or more parameters.

Step 1304 includes rendering a three-dimensional model representation of the at least one provisioned database in the at least one metaverse. In at least one embodiment, rendering a three-dimensional model representation of the at least one provisioned database in the at least one metaverse includes processing, using a metaverse database processor, event-related data pertaining to performing the rendering.

Step 1306 includes performing one or more automated actions based at least in part on one or more avatar actions carried out in connection with the rendered three-dimensional model representation of the at least one provisioned database in the at least one metaverse. In one or more embodiments, performing one or more automated actions includes enabling user management, via the at least one avatar, of the at least one provisioned database based at least in part on one or more avatar actions carried out in connection with the rendered three-dimensional model representation of the at least one provisioned database in the at least one metaverse.

Additionally or alternatively, in at least one embodiment, performing one or more automated actions includes generating and outputting, to a metaverse database processor, event data pertaining to the one or more avatar actions carried out in connection with the dimensional model representation of the at least one provisioned database in the at least one metaverse. Such an embodiment further includes generating, by the metaverse database processor, and outputting, to a database provisioning management system external to the at least one metaverse, at least one application programming interface call comprising one or more instructions for executing one or more database actions, related to the one or more avatar actions, on the at least one provisioned database. Also, such an embodiment additionally includes executing, in accordance with the one or more instructions, the one or more avatar actions on the at least one provisioned database, and displaying results, in the rendered three-dimensional model representation of the at least one provisioned database, of the one or more database actions executed in the at least one provisioned database.

Accordingly, the particular processing operations and other functionality described in conjunction with the flow diagram of FIG. 13 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically provision databases in a metaverse. These and other embodiments can effectively overcome problems associated with limitations related to user productivity, user efficiency, and user experience.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 14 and 15. Although described in the context of system 100, these platforms may also be used to implement at least portions of other information processing systems in other embodiments.

Figure 14:
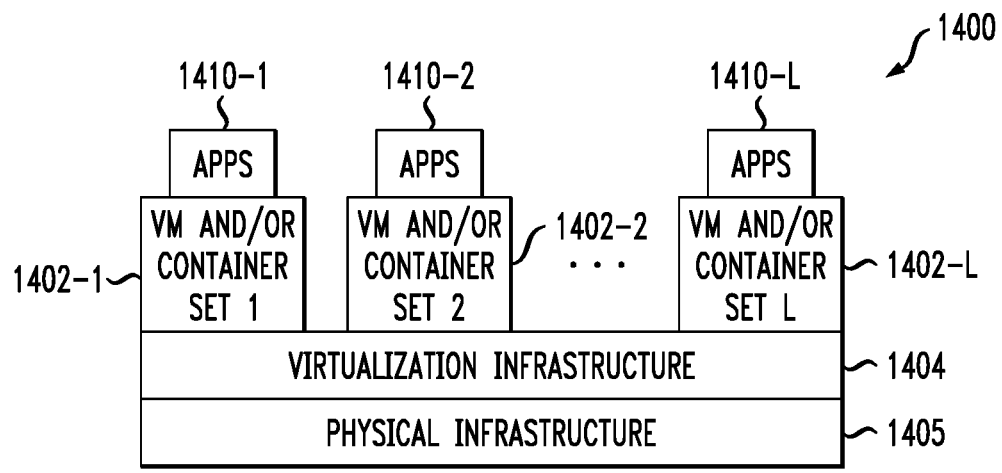
FIGS. 14 and 15 show examples of processing platforms that may be utilized to implement at least a portion of an information processing system in illustrative embodiments.
Figure 15:
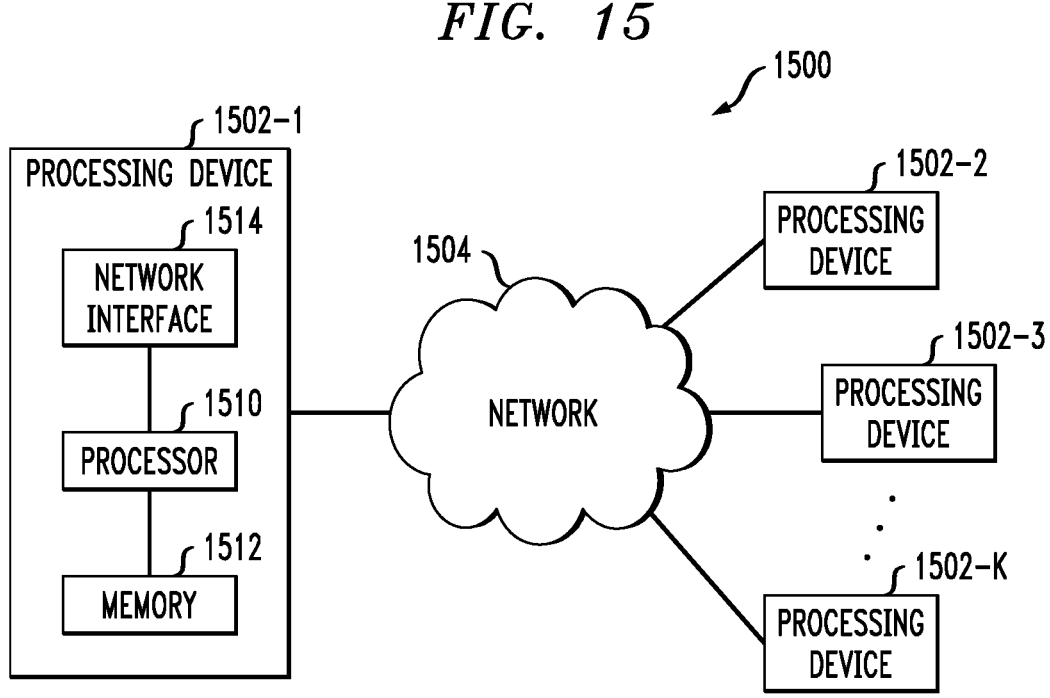

FIG. 14 shows an example processing platform comprising cloud infrastructure 1400. The cloud infrastructure 1400 comprises a combination of physical and virtual processing resources that are utilized to implement at least a portion of the information processing system 100. The cloud infrastructure 1400 comprises multiple virtual machines (VMs) and/or container sets 1402-1, 1402-2, . . . 1402-L implemented using virtualization infrastructure 1404. The virtualization infrastructure 1404 runs on physical infrastructure 1405, and illustratively comprises one or more hypervisors and/or operating system level virtualization infrastructure. The operating system level virtualization infrastructure illustratively comprises kernel control groups of a Linux operating system or other type of operating system.

The cloud infrastructure 1400 further comprises sets of applications 1410-1, 1410-2, . . . 1410-L running on respective ones of the VMs/container sets 1402-1, 1402-2, . . . 1402-L under the control of the virtualization infrastructure 1404. The VMs/container sets 1402 comprise respective VMs, respective sets of one or more containers, or respective sets of one or more containers running in VMs. In some implementations of the FIG. 14 embodiment, the VMs/container sets 1402 comprise respective VMs implemented using virtualization infrastructure 1404 that comprises at least one hypervisor.

A hypervisor platform may be used to implement a hypervisor within the virtualization infrastructure 1404, wherein the hypervisor platform has an associated virtual infrastructure management system. The underlying physical machines comprise one or more information processing platforms that include one or more storage systems.

In other implementations of the FIG. 14 embodiment, the VMs/container sets 1402 comprise respective containers implemented using virtualization infrastructure 1404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1400 shown in FIG. 14 may represent at least a portion of one processing platform. Another example of such a processing platform is processing platform 1500 shown in FIG. 15.

The processing platform 1500 in this embodiment comprises a portion of system 100 and includes a plurality of processing devices, denoted 1502-1, 1502-2, 1502-3, . . . 1502-K, which communicate with one another over a network 1504.

The network 1504 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1502-1 in the processing platform 1500 comprises a processor 1510 coupled to a memory 1512.

The processor 1510 comprises a microprocessor, a CPU, a GPU, a TPU, a microcontroller, an ASIC, a FPGA or other type of processing circuitry, as well as portions or combinations of such circuitry elements.

The memory 1512 comprises random access memory (RAM), read-only memory (ROM) or other types of memory, in any combination. The memory 1512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1502-1 is network interface circuitry 1514, which is used to interface the processing device with the network 1504 and other system components, and may comprise conventional transceivers.

The other processing devices 1502 of the processing platform 1500 are assumed to be configured in a manner similar to that shown for processing device 1502-1 in the figure.

Again, the particular processing platform 1500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   processing data associated with at least one avatar in at least one metaverse, the data pertaining to provisioning one or more databases in connection with the at least one metaverse;
   provisioning at least one database of the one or more databases based at least in part on the processing of the data pertaining to the provisioning one or more databases in connection with the at least one metaverse;
   rendering a three-dimensional model representation of the at least one provisioned database in the at least one metaverse; and
   performing one or more automated actions based at least in part on one or more avatar actions carried out in connection with the rendered three-dimensional model representation of the at least one provisioned database in the at least one metaverse, wherein performing one or more automated actions comprises:
      generating and outputting, to a metaverse database processor, event data pertaining to the one or more avatar actions;
      generating, using the metaverse database processor in connection with the event data pertaining to the one or more avatar actions, at least one application programming interface call comprising one or more instructions for executing one or more database actions, related to the one or more avatar actions, on the at least one provisioned database; and
      outputting, to a database provisioning management system external to the at least one metaverse, the at least one application programming interface call;
   wherein the method is performed by at least one processing device comprising a processor coupled to a memory.

2. The computer-implemented method of claim 1, wherein performing one or more automated actions comprises enabling user management, via the at least one avatar, of the at least one provisioned database based at least in part on the one or more avatar actions carried out in connection with the rendered three-dimensional model representation of the at least one provisioned database in the at least one metaverse.

3. The computer-implemented method of claim 1, wherein provisioning at least one database of the one or more databases comprises initiating at least one application programming interface call to the database provisioning management system to request creation of at least one virtual machine.

4. The computer-implemented method of claim 3, wherein initiating at least one application programming interface call comprises using one or more items of the data pertaining to provisioning one or more databases in connection with the at least one metaverse in the at least one application programming interface call as one or more parameters.

5. The computer-implemented method of claim 1, wherein performing one or more automated actions comprises executing, in accordance with the two or more instructions, the one or more database actions on the at least one provisioned database.

6. The computer-implemented method of claim 5, wherein performing one or more automated actions comprises displaying results, in the rendered three-dimensional model representation of the at least one provisioned database, of the one or more database actions executed on the at least one provisioned database.

7. The computer-implemented method of claim 1, wherein processing data pertaining to provisioning one or more databases in connection with the at least one metaverse comprises implementing at least one graphical user interface in connection with the at least one metaverse.

8. The computer-implemented method of claim 1, wherein rendering a three-dimensional model representation of the at least one provisioned database in the at least one metaverse comprises processing, using the metaverse database processor, event-related data pertaining to performing the rendering.

9. A non-transitory processor-readable storage medium having stored therein program code of one or more software programs, wherein the program code when executed by at least one processing device causes the at least one processing device:
to process data associated with at least one avatar in at least one metaverse, the data pertaining to provisioning one or more databases in connection with the at least one metaverse;
to provision at least one database of the one or more databases based at least in part on the processing of the data pertaining to the provisioning one or more databases in connection with the at least one metaverse;
to render a three-dimensional model representation of the at least one provisioned database in the at least one metaverse; and
to perform one or more automated actions based at least in part on one or more avatar actions carried out in connection with the rendered three-dimensional model representation of the at least one provisioned database in the at least one metaverse, wherein performing one or more automated actions comprises:
generating and outputting, to a metaverse database processor, event data pertaining to the one or more avatar actions;
generating, using the metaverse database processor in connection with the event data pertaining to the one or more avatar actions, at least one application programming interface call comprising one or more instructions for executing one or more database actions, related to the one or more avatar actions, on the at least one provisioned database; and
outputting, to a database provisioning management system external to the at least one metaverse, the at least one application programming interface call.

10. The non-transitory processor-readable storage medium of claim 9, wherein performing one or more automated actions comprises enabling user management, via the at least one avatar, of the at least one provisioned database based at least in part on the one or more avatar actions carried out in connection with the rendered three-dimensional model representation of the at least one provisioned database in the at least one metaverse.

11. The non-transitory processor-readable storage medium of claim 9, wherein provisioning at least one database of the one or more databases comprises initiating at least one application programming interface call to the database provisioning management system to request creation of at least one virtual machine.

12. The non-transitory processor-readable storage medium of claim 9, wherein performing one or more automated actions comprises executing, in accordance with the two or more instructions, the one or more database actions on the at least one provisioned database.

13. The non-transitory processor-readable storage medium of claim 12, wherein performing one or more automated actions comprises displaying results, in the rendered three-dimensional model representation of the at least one provisioned database, of the one or more database actions executed on the at least one provisioned database.

14. The non-transitory processor-readable storage medium of claim 9, wherein processing data pertaining to provisioning one or more databases in connection with the at least one metaverse comprises implementing at least one graphical user interface in connection with the at least one metaverse.

15. An apparatus comprising:
at least one processing device comprising a processor coupled to a memory;
the at least one processing device being configured:
to process data associated with at least one avatar in at least one metaverse, the data pertaining to provisioning one or more databases in connection with the at least one metaverse;
to provision at least one database of the one or more databases based at least in part on the processing of the data pertaining to the provisioning one or more databases in connection with the at least one metaverse;
to render a three-dimensional model representation of the at least one provisioned database in the at least one metaverse; and
to perform one or more automated actions based at least in part on one or more avatar actions carried out in connection with the rendered three-dimensional model representation of the at least one provisioned database in the at least one metaverse, wherein the performing one or more automated actions comprises:
generating and outputting, to a metaverse database processor, event data pertaining to the one or more avatar actions;
generating, using the metaverse database processor in connection with the event data pertaining to the one or more avatar actions, at least one application programming interface call comprising one or more instructions for executing one or more database actions, related to the one or more avatar actions, on the at least one provisioned database; and
outputting, to a database provisioning management system external to the at least one metaverse, the at least one application programming interface call.

16. The apparatus of claim 15, wherein performing one or more automated actions comprises enabling user management, via the at least one avatar, of the at least one provisioned database based at least in part on the one or more avatar actions carried out in connection with the rendered three-dimensional model representation of the at least one provisioned database in the at least one metaverse.

17. The apparatus of claim 15, wherein provisioning at least one database of the one or more databases comprises initiating at least one application programming interface call to the database provisioning management system to request creation of at least one virtual machine.

18. The apparatus of claim 15, wherein performing one or more automated actions comprises executing, in accordance with the two or more instructions, the one or more database actions on the at least one provisioned database.

19. The apparatus of claim 18, wherein performing one or more automated actions comprises displaying results, in the rendered three-dimensional model representation of the at least one provisioned database, of the one or more database actions executed on the at least one provisioned database.

20. The apparatus of claim 15, wherein processing data pertaining to provisioning one or more databases in connection with the at least one metaverse comprises implementing at least one graphical user interface in connection with the at least one metaverse.

* * * * *